Aug. 26, 1930.    J. A. TOLEIK    1,773,892
ELECTRIC WELDING
Filed Dec. 8, 1926    5 Sheets-Sheet 2

Fig. 2

INVENTOR
John A. Toleik
BY Munday, Clarke & Carpenter
ATTORNEYS

Aug. 26, 1930.  J. A. TOLEIK  1,773,892
ELECTRIC WELDING
Filed Dec. 8, 1926  5 Sheets-Sheet 3

Aug. 26, 1930.                J. A. TOLEIK                1,773,892
                             ELECTRIC WELDING
                           Filed Dec. 8, 1926         5 Sheets-Sheet 5

Patented Aug. 26, 1930

1,773,892

UNITED STATES PATENT OFFICE

JOHN A. TOLEIK, OF WEST ORANGE, NEW JERSEY, ASSIGNOR TO AMERICAN CAN COMPANY, OF NEW YORK, N. Y., A CORPORATION OF NEW JERSEY

ELECTRIC WELDING

Application filed December 8, 1926. Serial No. 153,252.

This invention relates in general to spot welding, and while it has particular reference to the spot welding of the side seams of tin cans, it will be readily manifest that it has other and more general applications, and that many of its features and sub-combinations are readily adaptable to valuable employment for various and sundry other uses.

A principal object of the invention is the provision of a spot welding device or apparatus capable of ready incorporation in a can body forming apparatus, and this without the requirement of substantial re-design of the body forming apparatus or reconstruction of its usual operating mechanisms.

In the forming of tin cans, blanks are ordinarily arranged in a body former in stack formation and fed from the stack in processional order and past instrumentalities which notch and finally arrange each blank curved about the horn, with the central portions of its edges between the notches formed into interengaging hooks or folds. These edges are bumped or compressed to form a lock seaming portion extending throughout the greater part of the length of the blank. At the ends of this lock portion the blank edges are overlapped to facilitate double seaming of the can ends to the body. Where the can is intended to be opened by the consumer of its contents by removing a tearing strip set off by score lines encircling the body, the lap part of the seam at one end is made sufficiently wide to accommodate both the seam and the tearing strip. While the entire side seaming is soldered after the body is formed, it has been found advantageous, particularly where the wide lap portions above described are provided, to spot weld the laps at a point near the end of the body, and while the invention will be hereinafter described in connection with a body maker particularly arranged and adapted to construct bodies of the said tearing strip character, it will, of course, be manifest that the invention is capable of incorporation in can, container and receptacle making machines adapted to produce a wide variety of cans, containers, and receptacles, and is capable also of incorporation in machines for other purposes, and also of use as an independent apparatus, my invention contemplating all of such uses of the invention as may fall within the scope of the appended claims.

An important object of the invention is the provision of a spot welding unit or construction for incorporation in a body maker or other apparatus wherein the can bodies or other subject articles are presented for spot welding in rapidly moving processional order, or, differently stated, my invention has for an object the provision of a spot welding mechanism adapted for successful and efficient operation at high speed.

Another important object of the invention is the provision of a spot welding mechanism wherein the electrodes employed will be constructed, arranged and operated in such manner as to permit of high output of the mechanism with minimum deterioration of the electrodes from the successive welding actions, so that there will be minimum interruption of its continued action through the necessity of repair, readjustment or replacement of the parts.

Another important object of the invention is the provision of a spot welding mechanism adapted for incorporation in a can body former, the construction of the parts of which and their operation will be such that the welding operations may occur without in any manner altering the normal and usual feed of the formed bodies along the forming and/or soldering horn.

Another important object of the invention is the provision of a spot welding mechanism which, when incorporated in a can body former or other apparatus, will be positively prevented from accomplishing its periodic welding operation in the absence of a can body or other article arranged to receive the weld.

Another important object of the invention is the provision of a mechanism which may be operated at high speed, and which will permit of the use of a heavy welding current without danger of destructive arcing as a result of the rapidly repeated applications of the current.

Numerous other objects and advantages of the invention will be apparent as it is better understood from the following description, which, taken in connection with the accompanying drawings, discloses a preferred embodiment thereof.

Referring to the drawings.

For the purpose of illustrating my present invention, I have shown on the drawings a can body maker and former which comprises a base 21 supporting the operating parts and devices. The details of construction of much of this body former are unimportant to an understanding of the present invention, and only a general description thereof is, therefore, inserted herein.

A frame extension 22 clamped on the main frame 21 is provided with a stack holder 23, in which body blanks 24 are arranged. Reference character 25 indicates a swinging suction arm for drawing down successively the lowermost blanks of the stack into position to be engaged by a feed slide 26, which reciprocates through the action of suitable link and lever mechanisms 27 to arrange the blanks in processional order and intermittently advance them through the machine. The blanks first pass a notching station 28, in which notches are provided in the ends of the blanks to determine the lock and lap portions of the seam to be formed. After the blanks moving in their processional order have passed through the notcher they arrive at a bending station 29 where they are moved endwise in the present machine and are wrapped about a mandrel or horn 31. Here feed devices 32 intermittently move them on through the machine and past an edging device which forms the ends of the blanks with their hook portions for making the lock part of the side seam.

Thereafter, the blanks in their progressive intermittent movement arrive at a bumping station 33, where the hooked edges are interengaged and they are bumped by a bumper or hammer 34'. In the embodiment of the invention shown on the drawings, the welding mechanism is incorporated in the body former immediately after the bumping station and this welding mechanism is adapted to perform the welding operation desired on the formed can body during the pause normally given these bodies as an incident to the regular intermittent movement of the feed devices bringing the blanks and bodies through the machine. After passing the welding station, the can bodies pass to the usual soldering devices, which are merely indicated schematically at 34. In the embodiment of the invention shown on the drawing and selected for the purposes of illustration only, a single weld is desired and this is adapted to be arranged between the score lines indicated at 35 and the end 36 of the blank 24, which has now been formed into a can body.

Figures 12, 13, 14:
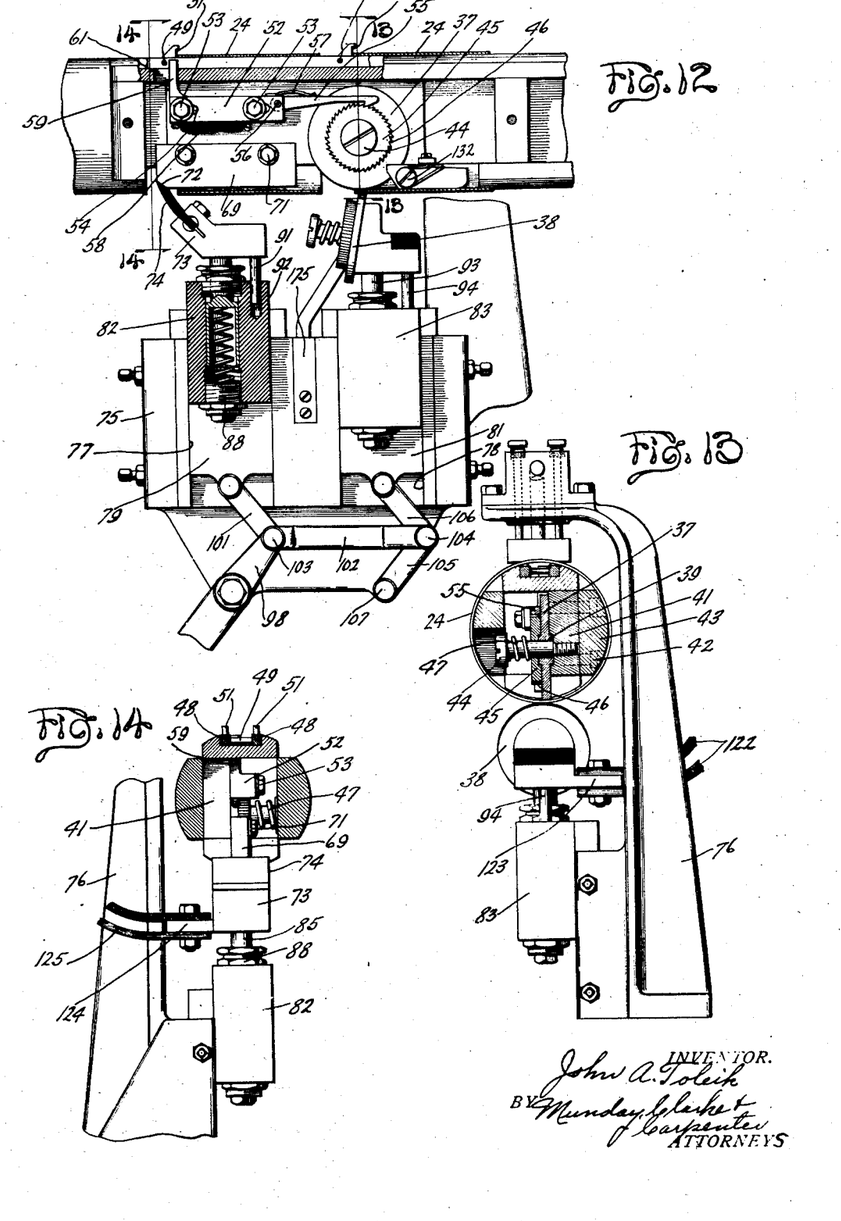
Fig. 12 is an enlarged elevation showing the parts in welding position and with a portion of the horn and can body removed to disclose internal devices.
Figs. 13 and 14 are sections taken, respectively, substantially on lines 13 and 14 of Fig. 12.

The electrodes for forming the welds in a can body consist of an electrode 37 arranged within the horn itself and a second electrode 38 arranged outside the horn and beneath the travel of the can body therealong. Each of these electrodes is in the form of a disc and they are arranged with their axes angularly disposed to each other, the plane of the disc 37 being a vertical plane through and along the axis of the horn, and the plane of the disc 38 being arranged transversely thereto and preferably off the vertical, so that merely an edge of the circular face of the disc 38 engages in the welding action. The electrode 37 is provided with an enlarged hub 39 (Fig. 13), the hub at one side and the face of the disc fitting against a correspondingly shaped back plate 41 secured by bolts 42 to the horn body part 43 therebehind. A shoulder screw 44 is positioned through the center of the disc 37 and is engaged in the mounting or support 41 already described. A ratchet member 45 provided with ratchet teeth 46 is positioned on the shoulder bolt 44 and is formed at its center to receive the adjacent hub part of the disc 37 and rest against this hub part and against the side face of the disc. A spring 47 presses the ratchet member against the disc and in turn the disc against the mounting 41, so that the disc or electrode 37 is frictionally held against movement during the welding operation. The can bodies 24 are fed along the horn by two spaced reciprocating feed bars 48 connected together by cross-pins 49 and carrying dogs 51 adapted to engage behind the bodies as indicated in Figure 12 during the feeding movement and to be retracted and pass through them on the return reciprocation.

A pawl mechanism is actuated by reciprocation of this feed slide to impart a small rotary movement to the electrode 37 after each welding operation, and this pawl mechanism comprises a reciprocating slide 52 mounted on shoulder screws 53, which engage the support or mounting 41 of the electrode. Said shoulder screws extend through slots 54 in the slide. A pawl 55 is pivoted at 56, on the slide and overlies the ratchet 37, being pressed thereagainst by a leaf spring 57. The slide 52 is pulled toward the right, viewing Fig. 12, by a spring 58 fast at one end to the slide and at the other end to the member 41. An arm 59 extends up through a slot 61 in the top horn member into position to be engaged by the cross-pin 49 which presents itself at the end of the return or idle stroke of the feed bars 48. In the present instance, this cross-pin is the one loacted at the right in Fig. 12. This engagement by the cross pin 49 moves the pawl 55 toward the left, viewing the figures, and rotates the ratchet 49 and the electrode 37 through an angle represented by a single tooth of the ratchet.

Figures 6, 7, 8, 9, 10, 11:
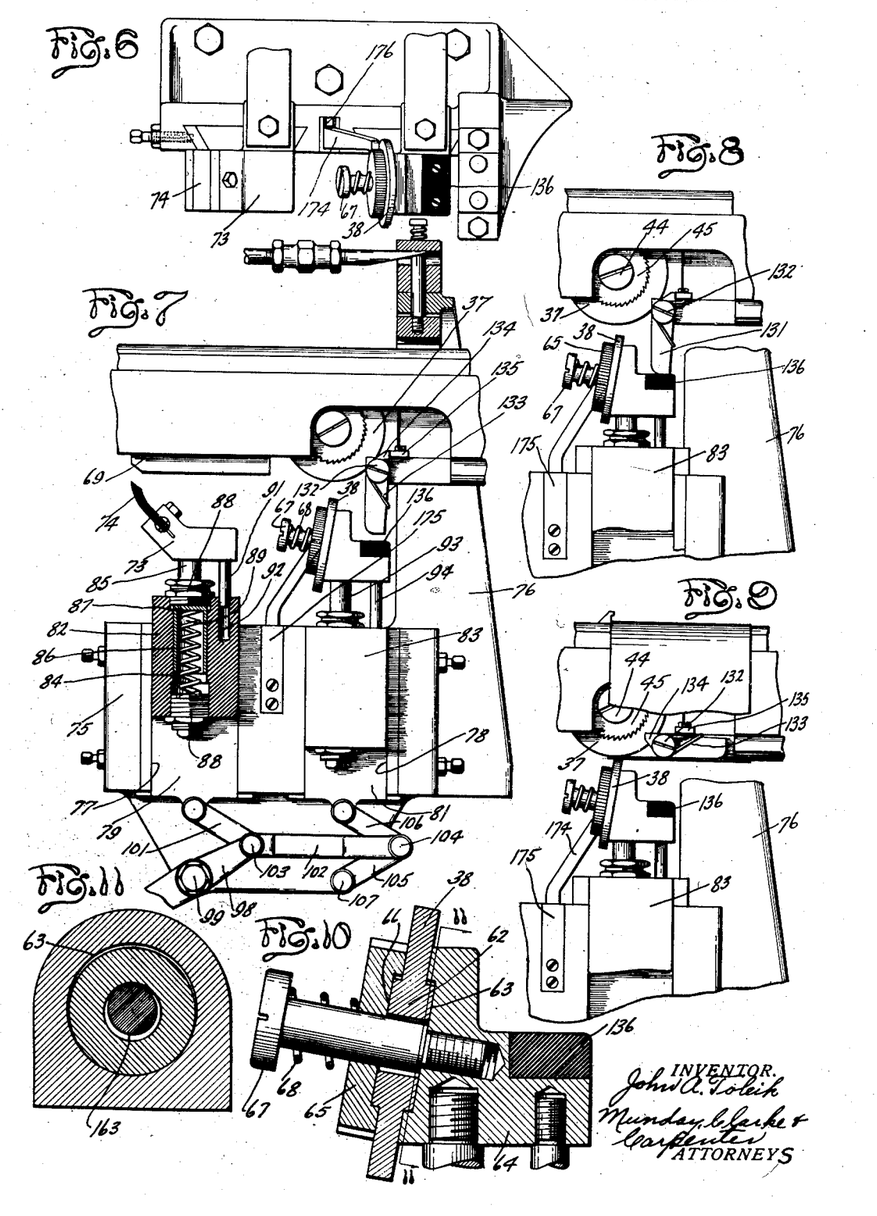
Fig. 6 is an enlarged top plan view of the lower electrode and its mounting.
Fig. 7 is an enlarged fragmentary elevation showing the relation of the two electrodes and their attendant parts.
Fig. 8 is a view similar to Fig. 7, showing the parts in different relation.
Fig. 9 is a view similar to Figs. 7 and 8, showing the electrodes in welding position.
Fig. 10 is a section taken vertically and along the axis of the lower electrode.
Fig. 11 is a section taken substantially on line 11—11 of Fig. 10.

The electrode 38 is shown in greatly enlarged detail in Fig. 10, and it and its mountings in many respects are substantially duplicates of those of the electrode 37. The disc or the electrode 38 is provided with a hub 62, which fits into a recess 63 in a movable electrode mounting 64, this mounting being formed, as will be readily observed, to engage both the hub and the flat side face of the disc. The face of this mounting is arranged in a desired plane to provide the desired inclination of the electrode 38.

A ratchet wheel or disc 65 is recessed at 66 to receive the hub and is so formed that the ratchet engages both the adjacent face of the hub and the adjacent flat face of the disc. A shoulder bolt 67 is arranged through the ratchet, through the disc and into engagement with the mounting 64 and this shoulder bolt is provided with a spring 68 pressing the ratchet against the disc 38 and the disc 38 against the mounting 64 so as to provide the desired frictional contact between these parts to hold the electrode against movement during the welding operation and to prevent the movement of the disc, except as it may be positively actuated, as will be presently described.

The present embodiment of the invention contemplates that the current will be delivered to the electrodes when in welding position through the mounting 64 and electrode 38 and thence through the seam to be welded to the electrode 37. This electrode is grounded to the horn and the horn carries a contact member 69 secured to the mounting 41 by bolts 71. This contact member is in the form of a plate and is arranged above the seam so the can bodies may freely pass it. When the can bodies are at rest, as shown in Fig. 12, an end of this contact member extends between adjacent can bodies and is bevelled or cut away as illustrated at 72. A contact head 73 carrying a yielding contact 74 made up of a plurality of contact leaves is arranged to move with the contact member 73.

Referring to Fig. 7, it will be noted that a guide member 75 is secured to an upright 76 arranged on the machine frame. This guide member 75 has two guideways 77 and 78 in which are mounted reciprocating slides 79 and 81. Each of these slides carries a block 82, 83. These blocks are of insulating material and the two are exactly alike, so the description of one of them will suffice. The block 82 is shown in section in Fig. 7 and it will be noted that a hollow bore 84 extends through this block. A post 85 fixed to the member 73 is provided at this lower end with a sleeve 86 arranged in the bore 84. The portion of the post provided with the sleeve 86 is larger than the part of the post extending beyond the block and thus provides a shoulder 87 which engages a sleeve nut 88 threaded into the top of the post. The lower end of the bore 84 is closed by a screw plug 88 and a spring 89 is positioned between this screw plug and the post 85 extending up into the sleeve part 86 of the post. A guide pin 91 is also secured to the mounting 73 and extends into a recess 92 in the post to prevent rotation of the contact member 74. Reference character 93 represents the post extending into the block 83 and reference character 94 the pin for preventing rotation of the electrode mounting.

The contact 74 and the electrode 38 are caused to reciprocate in timed relation with each other and in timed relation also with the movement of the can bodies by mechanism that will now be described:

While a description of the power mechanism for a body maker is not necessary for an understanding of the present invention, it should be mentioned that shaft 95 extending crosswise of the machine, and in the present instance employed to drive the bumper or hammer 34, is provided with a grooved cam 96 in which is arranged a roller 97 on a lever 98 pivoted at 99 below the slide 79. A link 101 connects the slide 79 with the upper end of lever 98. A link 102 is pivotally connected at one end at the connection 103 between lever 98 and link 101, and at the other end at 104 to two toggle links 105 and 106, the link 105 being pivoted at 107 on the guide member 75 and the link 106 being pivoted to the slide 87. At each revolution, therefore, of the shaft 95, both the contact member and the electrode 38 will be moved up into engagement, respectively, with the contact 69 and the can body positioned between the electrodes.

Figure 1:
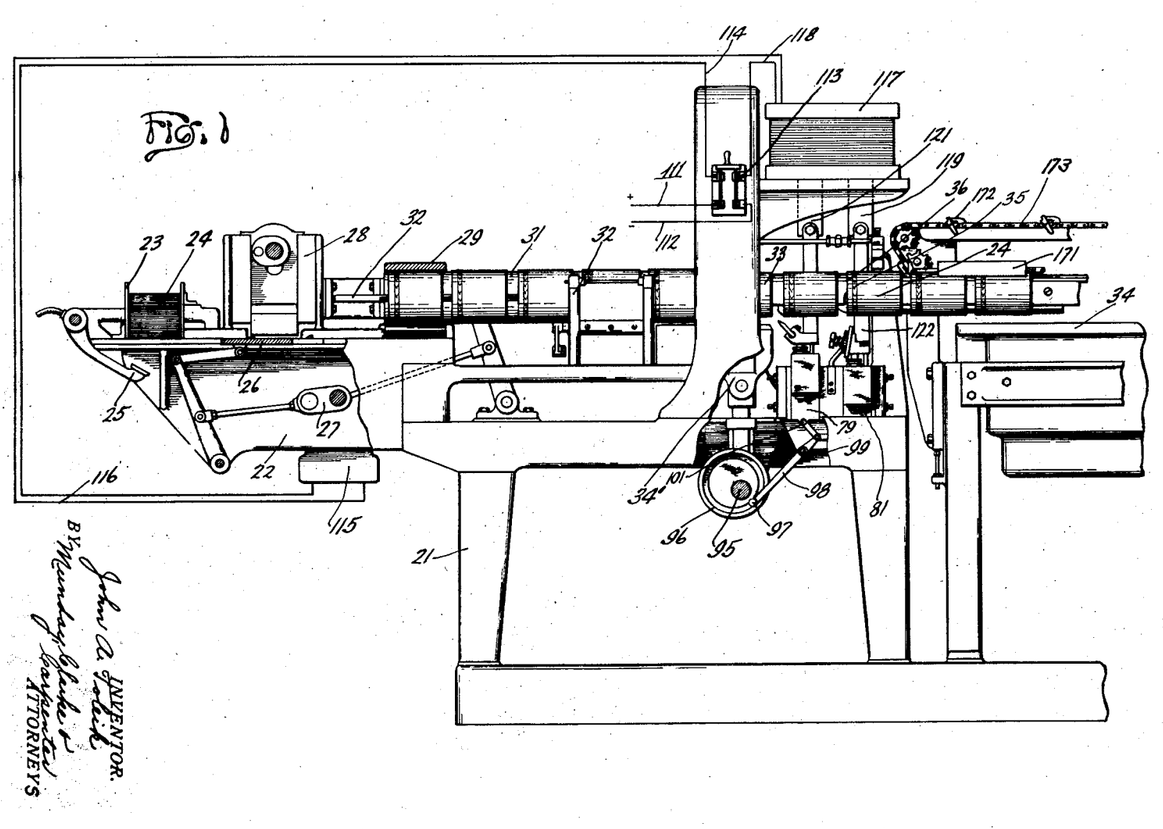
Figure 1 is a side elevation of a body maker in which is incorporated a spot welding mechanism designed and constructed in accordance with the present invention.
Figure 2:
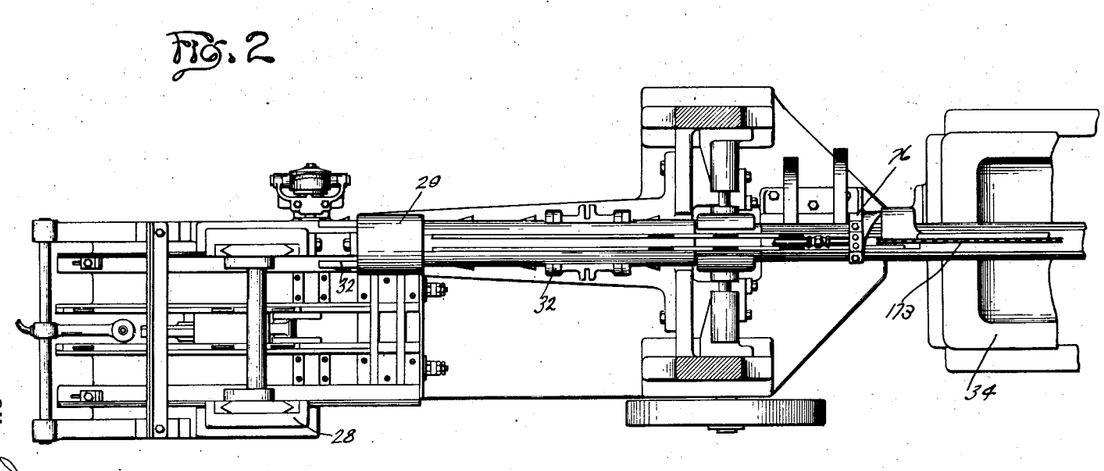
Fig. 2 is a top plan view thereof.

Welding current is supplied to the electrodes as will now be described: Referring to Fig. 1, reference character 111 indicates one side of a power line from any suitable source of current, and reference character 112 the other side. These connections go to a hand switch 113 of the double knife blade type and from this one wire 114 leads to a circuit breaker 115 adapted to be closed to supply current, as will be presently described, when the welding electrodes are in welding position and to break and interrupt said current before said electrodes leave said positions. From the circuit breaker a wire 116 leads to one leg of the primary of a transformer 117, the second leg of which is connected by a wire 118 to the switch 113. The secondary of the transformer 117 is provided with connector members 119 and 121. The connector member 119, through flexible leaf conductors 122, is connected to an arm or extension 123 at the back of the mounting for electrode 38. The welding current passes from the electrode 38 through the seam being welded to electrode 37, which is grounded in the horn and from the horn passes out through contact 74 to its mounting 73, having an extension 124 connected by leaf conductors 125 with conductor member 121.

Since the circuit maker and breaker 115 is automatically operated after each intermittent movement of the can body, and since also the welding circuits are completed through the reciprocation of the slides 79 and 81, it is desirable to prevent fusing of the electrodes together should a can body be absent at the welding station. Means are provided for interrupting the welding circuit, i. e. the secondary circuit from the transformer in the absence of a can body, and this means comprises an arm 131 pivoted at 132 in the horn and adapted when in the vertical position shown in Fig. 8 to depend over the mounting 64, preventing the mounting 64 from moving up to bring the electrodes into contact, the restraining of this movement being permitted by the spring in the block 83 similar to the spring 89 in the block 82. The arm 131 is pressed to obstructing position by a spring 133, the action of the arm under this spring being limited by a shoulder 134 on the top of the arm which engages a stop 135 suitably positioned. An insulating contact insert 136 is provided in the mounting 64 to insulate the arm from the mounting. The feeding of a can body to the welding station causes the lower edge or seam portion of the body to engage the arm 131 beneath its pivot and swing it up into the horn (as seen in Fig. 9) as the can is advanced. Positive means are thus provided to prevent the completion of the secondary or welding circuit in the absence of a can body at the welding station.

It is desired that the welding current be suddenly and powerfully applied and that as an incident to this there be no sparking at the welding station (the can bodies are of thin sheet material and easily burned) and this is prevented both by the circuit breaker, which will be presently described in detail, and by the firm yielding pressure exerted by the springs in the insulated blocks 82 and 83, which form firm contact between the electrodes 37 and 38 and the can body and also between the contacts 74 and 69.

Figure 3:
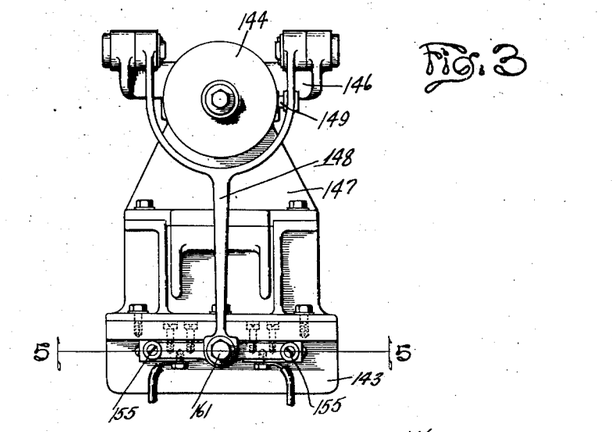
Fig. 3 is an end elevation of the circuit making and breaking switch forming a feature of the present invention.
Figure 4:
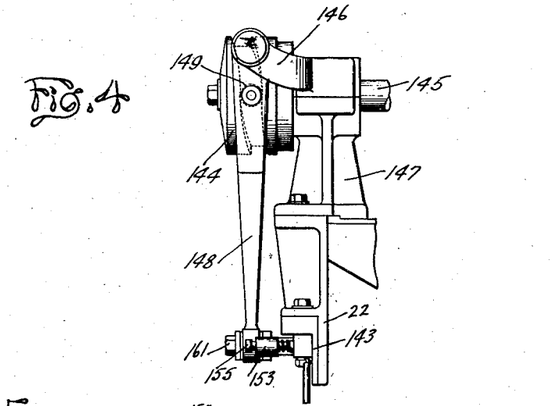
Fig. 4 is a side view thereof.
Figure 5:
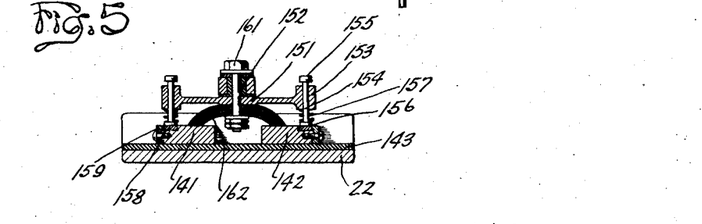
Fig. 5 is a section taken substantially on line 5—5 of Fig. 3.

The circuit breaker which is in the primary circuit, and which is shown more particularly in Figures 3 to 5, comprises fixed contacts 141 and 142, to which the wires 114 and 116 are suitably connected. The contacts 141 and 142 are mounted upon an insulated back 143 attached to a suitable part of the body maker frame; in the present instance to the extension 22. Movable contacts are adapted to be brought into engagement with a bridge, and the contacts 141 and 142 are provided for actuation in timed relation with the feeding of the body blanks and the forming of the bodies. A cam 144 is mounted upon a suitable shaft 145 in the apparatus which has one rotation for each feed of the can body. Bracket arms 146 extend out from a bearing 147 of this shaft and a bifurcated lever 148 is pivoted in said bracket arms and has a roll 149 engaging in the groove of the cam 144. The lever 148 is provided at its end with a cross-head 151 insulated by a bushing 152 from the lever. This cross-head has large bearing ends 153 for contact pins 154 having heads 155 and 156 on opposite sides of the bearings. A spring 157 pushes each pin to engage the pin head 155 with the cross-head. Removable contact plates 158, preferably of silver, are provided in the two fixed contacts 141 and 142 and are held in place by clamp locks 159. The bolt 161 which extends through the cross-head 151 passes also through a plurality of heavy resilient contact leaves 162 adapted to bridge the contacts 141 and 142 when the lever is moved to close the circuit breaker. The contacts 157 are spark controlling contacts and the contact bridge or member 162 constitutes a load carrying contact. The connection is such that after the welding electrodes are in position and contacts 69 and 74 in engagement, the heads 156 of the contact pins 154 first engage the contact members 158 and immediately thereafter the heavy contact leaves 162 bridge contacts 141 and 142. The timing of the apparatus is such also that prior to the separation of the contacts 69 and 74 or the electrode at the welding station, interruption is accomplished in the circuit breaker. Because the circuit is made and opened in the primary, sparking is reduced to a minimum and is sustained entirely by the silver plates 158, which are readily removable for re-forming or replacing.

In order to prevent warpage of the electrodes and attendant parts through the heating of the same as an incident to the welding operation, it will be noted from examining Figures 10 and 11 that the electrodes and their mountings have such relative dimensions as will permit of expansion from the welding heat. Figures 10 and 11 illustrate the construction of the electrode 38, but it will be understood that a similar relation of the dimensions of the parts is accomplished in the electrode 37 and its mounting. Viewing Figures 10 and 11, it will be apparent that the bore through electrode 38, which is indicated at 163, is somewhat larger than shoulder bolt 67 and that the recess 63 is slightly larger than hub 62 of the electrode. This permits of expansion in the plane of the electrode, expansion at right angles to the plane being accommodated by the spring 68.

After the cans are advanced from the welding station, they pass to a solder horn 171, where they are engaged by grippers 172 on a feed chain 173 and carried over the solder applying devices.

As has already been stated, the electrode 38 is spring-pressed against the can body seam when in welding position and in this position presents an edge of its circular face against the can body, both concentrating the pressure and providing minimum contact for maximum welding effect. After each welding operation, a slight rotation of the electrode 38 takes place and is produced by a pawl 174 pivoted in an insert 175 in the guide member 75 and backed up by a spring 176 in said insert. This pawl causes a one-tooth rotation of the ratchet 66 and electrode 38 upon each downward reciprocation of the slide 81. In thus rotating the two electrodes throughout minute arcs after each welding operation, the opportunity for pitting or burning the electrodes is materially reduced and it will be apparent that when the edge of the electrode 38 entering into the welding contact has finally deteriorated to a degree affecting its efficiency, the disc may be removed and reversed in position and the operation continued.

It will be apparent also that the construction of the parts, the ground connection from the electrode 37 to contact 69, etc., all facilitate the dissipation of the heat after welding.

It will be manifest from the foregoing that the soldering mechanism, hereinbefore described and embodying the present invention, while particularly adapted for use with can body making and article forming machines employing closely timed and successively operating article forming instrumentalities, is capable of efficient and valuable use independently thereof, and that certain of the features of the invention have even still other and wider application.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making can bodies and the like, the combination of a horn about which the can bodies may be formed and moved for successive operations, associated instrumentalities for forming a body upon said horn and engaging the edges of the body to form a lock and lap-seam can body, means for moving said bodies along said horn, an electrode located within the horn, an electrode located outside said horn and in juxtaposition with respect to the electrode within the horn, devices for producing relative movement between said electrodes to cause them to engage momentarily on opposite sides of the lap portion of said seam, and electric devices for producing a welding current from said electrodes and through a lap portion of said seam.

2. In a machine for making can bodies and the like, the combination of a horn, seam forming and soldering instrumentalities arranged alongside of said horn and a welding device positioned between said seam forming and soldering instrumentalities, said welding device comprising contact members arranged inside and outside said horn, means producing relative motion between said contact members to cause them to engage opposite faces of the seam, and an electric connection for supplying a welding current to said contact member.

3. In a machine for making can bodies and the like, comprising, a horn upon which can bodies may be formed and along which they may be moved, a welding electrode arranged within said horn and in position to engage the seam of a can when the can is in predetermined position, said electrode being grounded to the horn, a welding electrode and a contact member conjointly movable into engagement, respectively, with the seam of the can and into ground connection with a portion of said horn, and means supplying a welding current through said contact member, ground and electrodes.

4. In a machine for making can bodies and the like, the combination of a horn upon which can bodies may be formed and moved therealong for subsequent operation, a contact member grounded to the machine and arranged within the horn for engagement with a seamed portion of a can body when said can body is in predetermined position, a second contact member movable to engage the seam opposite the contact member within the horn, a third ground contact member adapted to be moved conjointly with the second mentioned contact member into closed current relation with the machine, and means supplying welding current through said contact members to weld the seam engaged between the contact members.

5. In a machine for making can bodies and the like, the combination of a horn on which can bodies may be formed and along which they may be moved, a spot-welding device associated with said horn and comprising an electrode located within the horn and an electrode located without the horn, means for producing relative movement of said electrodes into engagement with the seam of the can body in predetermined position on said horn, and means supplying a welding current through said electrode and can body seam.

6. In a machine for making can bodies and the like, the combination of a horn on which can bodies may be formed and along which they may be moved, a spot-welding device associated with said horn and comprising an electrode located within the horn and an electrode located without the horn, means for producing relative movement of said electrodes into engagement with the seam of the can body in predetermined position on said horn, and means supplying a welding current through said electrode and can body seam, said last mentioned means including a source of energy, a direct connection between the electrode located without the horn and a connection grounded through the horn to the electrode within the horn.

7. In an article forming machine, the combination of a mandrel along which formed articles may be moved in processional arrangement, spot-welding contacts arranged within and without said mandrel and on opposite sides of the path of travel of parts of said articles, means producing periodic relative movement of said contacts in timed relation to the processional order of said articles and into engagement with each said article to spot-weld the same, and a device for precluding welding engagement in the absence of a said article.

8. In an article forming machine, the combination of a mandrel along which formed articles may be moved in processional arrangement, spot-welding contacts arranged within and without said mandrel and on opposite sides of the path of travel of parts of said articles, means producing periodic relative movement of said contacts in timed relation to the processional order of said articles and into engagement with each said article to spot-weld the same, and a device for precluding welding engagement in the absence of a said article, said device being operable by each said article as it arrives at spot-welding position.

9. In an article forming machine, the combination of a mandrel along which formed articles may be moved in processional order, a spot-welding electrode arranged within said mandrel, a spot-welding electrode arranged outside and adjacent said mandrel and periodically movable to cause engagement of the article with both said welding electrodes, and a finger member normally opposing the movement of said outside movable electrode and adapted to be moved to inoperative position by the presence of an article in spot-welding position.

10. In an article forming machine, the combination of a mandrel along which formed articles may be moved in processional order, a welding electrode and contact member located within said mandrel and in electric connection with each other, a welding electrode and a contact member arranged without said mandrel and adapted for conjoint movement as each article is presented in spot-welding position, said welding electrode pressing the article against the electrode within the mandrel, and said contact member engaging directly the contact member within the mandrel and between the articles in processional order.

11. An article forming mechanism, the combination of a mandrel along which formed articles may be moved in processional order, a welding electrode arranged within said mandrel and in position to engage a said article at the welding station, a welding electrode arranged without said mandrel, a yielding support for said electrode, and means moving said electrode periodically and in timed relation with the processional order of said articles to produce pressure welding contact between said electrodes and said article.

12. An article forming mechanism, the combination of a mandrel along which formed articles may be moved in processional order, welding electrodes arranged within and without said mandrel and adapted to engage the opposite sides of a part of each said article, a contact member arranged within said mandrel and a contact member arranged without said mandrel, said contact members being adapted for yielding engagement between said articles as a said article is arranged at the welding station.

13. In an article forming machine, the combination of a mandrel along which formed articles may be moved in processional order, an electrode arranged within said mandrel and in position to engage each said article at the welding station, an outside welding electrode and an outside contact member conjointly movable and separately mounted, said contact member engaging a horn part as an incident to said conjoint movement, and said electrode engaging the article in co-operation with the electrode within the horn, one of the mountings of said outside electrode and said contact member being insulated from the rest of said machine.

14. In a spot-welding machine, the combination of co-operating spot-welding electrodes, a said electrode comprising a disc, a mounting therefor which engages a plane face of said disc and yielding means for forcing said disc against said mounting.

15. In a spot-welding machine, the combination of co-operating spot-welding electrodes, a said electrode comprising a disc, a mounting therefor which engages a plane face of said disc, and means periodically rotatably moving said disc against the friction created by said yielding means and said mounting.

16. In an article forming machine, the combination of a guide along which formed articles may be moved, a device for feeding said articles along said guide, co-operating contacts for spot-welding said articles as they arrive at the welding station, and a device operated by said feeding device for moving a said electrode to present successive portions thereof for contact at successive welding operations.

JOHN A. TOLEIK.